United States Patent [19]

Loce et al.

[11] Patent Number: 4,653,901
[45] Date of Patent: Mar. 31, 1987

[54] DOCUMENT IMAGING SYSTEM USING A THREE-DIMENSIONAL RELATIVE ILLUMINATION CORRECTOR

[75] Inventors: Robert P. Loce, Webster; Melvin E. Deibler, Williamson, both of N.Y.

[73] Assignee: Xerox Corporation, Stamford, Conn.

[21] Appl. No.: 853,594

[22] Filed: Apr. 18, 1986

[51] Int. Cl.⁴ .............................................. G03B 27/72
[52] U.S. Cl. ......................................... 355/71; 355/67
[58] Field of Search ..................... 355/67, 71; 352/198

[56] References Cited

U.S. PATENT DOCUMENTS

| | | | |
|---|---|---|---|
| 1,900,966 | 3/1933 | Wolfe | 352/198 |
| 2,327,818 | 8/1943 | Peterson | 355/67 |
| 2,805,599 | 9/1957 | Pajes | 355/71 |
| 3,504,960 | 4/1970 | Harper | 350/205 |
| 3,561,867 | 2/1971 | Simmon | 355/67 |
| 3,669,538 | 6/1972 | Fowler | 355/67 |
| 3,777,135 | 12/1973 | Rees | 240/41.35 R |
| 4,172,658 | 10/1979 | Tani et al. | 355/71 |
| 4,298,274 | 11/1981 | Rees et al. | 355/71 |
| 4,445,774 | 5/1984 | Spinelli et al. | 355/71 |

*Primary Examiner*—Monroe H. Hayes

[57] ABSTRACT

A three-dimensional, relative illumination corrector is positioned in a document imaging system so as to compensate for the cos 4 illumination falloff effect at the center field angles. The corrector is positioned at either the image or the object side of the system projection lens. In a first embodiment, the corrector is a generally conical, solid body. In a second embodiment, the corrector interior is hollow to permit a higher level of on-axis illumination.

7 Claims, 6 Drawing Figures

NOTE: 1.0 FRACTION FIELD CORRESPONDS TO 22°

DOCUMENT IMAGING SYSTEM USING A THREE-DIMENSIONAL RELATIVE ILLUMINATION CORRECTOR

BACKGROUND AND PRIOR ART STATEMENT

This invention relates generally to an imaging system for projecting an image of an object lying on an object plane, such as a transparent platen, onto an image plane and, more particularly, to an improved system which incorporates a three-dimensional corrector element positioned along an optical path to correct for cos 4 illumination falloff and other illumination non-uniformities of the system projection lens so as to provide a uniform exposure level at the image plane.

In imaging systems such as those used in electrophotographic copying and printing devices, a document is placed on a transparent platen surface, illuminated by a scanning or flash illumination assembly, and a reflected image of the document is projected through a lens onto the charged surface of a photosensitive member such as a xerographic drum or belt-type photoreceptor. Those areas of the charged surface which are irradiated by the projected image are discharged, forming a latent image of the document. The degree of discharge is dependent on the intensity of the projected light rays. It is important that the exposure irradiance at the charged photosensitive surface vary only due to the reflectance characteristics of the original document being copied rather than due to changes introduced by the imaging components such as the lens and folding mirrors. Stated in another manner, an optimum system would provide uniform photoreceptor irradiance given a uniformly reflecting document.

The most significant factor which affects the relative illumination at an image plane is the cosine (cos 4) variation caused by the projection lens viewing document points at the outer ends of the field of view. The illumination at the image plane is proportional to the cos 4 of the angle between the optical axis and the off-axis principal rays. Irradiance at the image plane therefore decreases as radial distance from the system optical axis increases, resulting in a lower level of exposure of the edges of the document thereby causing resulting loss of image quality in copies made from the developed image.

Various approaches have been devised to compensate for this cos 4 effect. Typically, in scanning systems, a sheet of opaque material having a butterfly slit formed thereon is placed in the optical path near the object or image plane thereby acting as a field stop. The area of the slit is inversely proportional to the illumination profile. Other similar techniques employ masks having slits of this nature integral with the lens. Still other scanning systems place a variable density filter in the optical path, the transmissiveness of the filter varying inversely to the cos 4 angle.

It is also known to use optical stops in photographic systems to reduce oblique spherical aberrations. A system employing optical stops is disclosed in U.S. Pat. No. 3,504,960. This type of stop is characterized by having borders of various configurations surrounding a central clear aperture. These stops are not, however, concerned with, and are not a substitute for, cos 4 compensation.

Another prior art imaging system disclosed in U.S. Pat. No. 4,445,774, assigned to the same assignee as the present application, utilizes an opaque illumination corrector of a specially designed shape in the optical path to selectively compensate for the cos 4 effects.

In full frame imaging systems where an entire document is typically illuminated by a flash lamp, efforts to compensate for cos 4 light falloff have emphasized locating the lamps so that the document edges are illuminated to a greater degree than central areas. Two such systems are disclosed in U.S. Pat. Nos. 3,669,538 and 3,777,135. Another related technique is to place a variable density filter into the optical path as disclosed in U.S. Pat. No. 4,298,274.

The above-described compensation techniques each have significant disadvantages. The variable density filters are relatively expensive and their use entails significant energy losses. The optical slit techniques also entail energy losses and require substantial modification of the imaging system so as to operate in more than one magnification reproduction mode. The opaque illuminator corrector disclosed in the '774 patent loses efficiency at the wider field angles and experiences some loss of image quality at an on-axis location.

The present invention, therefore, is directed to a cos 4 relative illumination corrector which is inexpensive and easily placed into the optical path. More particularly, the present invention is directed to an imaging system wherein an object lying in an object plane is illuminated and an image is projected onto an image plane comprising, in combination:

a projection lens, and at least one three-dimensional corrector positioned between said object and image planes and within the field of view of the lens, said corrector adapted to selectively vignette energy emanating from said field of view so as to provide a relatively uniform exposure level at the image plane.

In a second embodiment, the corrector has a hollow circular interior of varying diameter to improve on-axis image quality while correcting cos 4 falloff.

IN THE DRAWINGS

DESCRIPTION

Figure 1C:
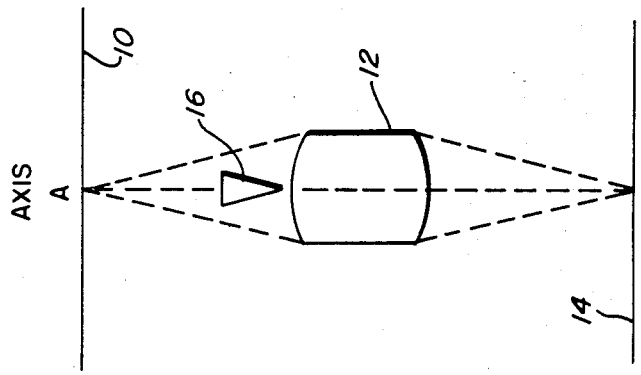
FIGS. 1a, 1b, 1c show the vignetting effect along an image plane axis by placing a first embodiment of a three-dimensional corrector having a conical configuration in the object space of an imaging system.
Figure 1B:
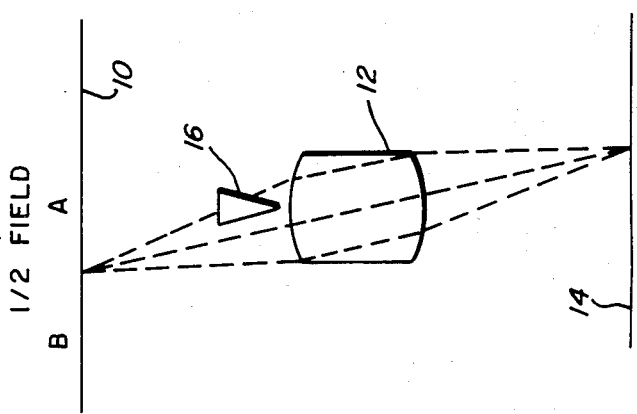
Figure 1A:
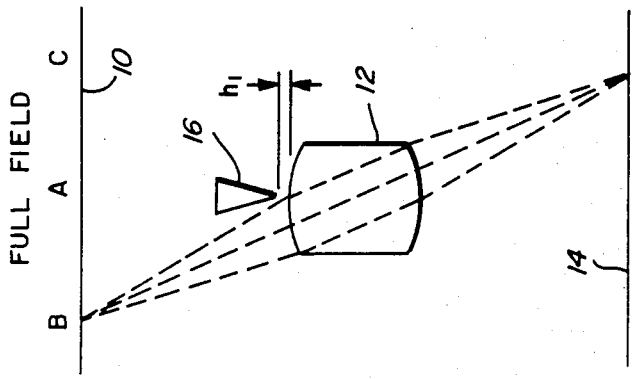

The general principle of the invention is demonstrated by viewing a three-dimensional cone in the object space of an imaging system as shown in FIG. 1. Referring to FIG. 1, there is shown an object plane 10, a projection lens 12 and a photosensitive image plane 14. The field of view of lens 12 extends from point A to point C with point A being the center axial point. A rotationally symmetrical, three-dimensional cone 16 is coincident with the optical axis of the lens at a distance X from the entrance pupil. The cone will prevent light reflected from the document from reaching the image plane in a varying manner, depending on the position of the object point and the cone shape and position. Cone 16 is chosen to have a geometry and location such that the reduction in energy reaching the image plane from the on-axis location (point A) to the full field defined by points B and C will vary from the zero vignetting at full field shown in FIG. 1a to the partial vignetting shown in FIG. 1b to the full vignetting on-axis shown in FIG. 1c. By proper design, cone 16 can be used to compensate for the effects of cos4 illumination falloff at the edges of the field. The exact shape of the cone and its position along the optical axis is dependent on the design of the lens.

Figure 2:
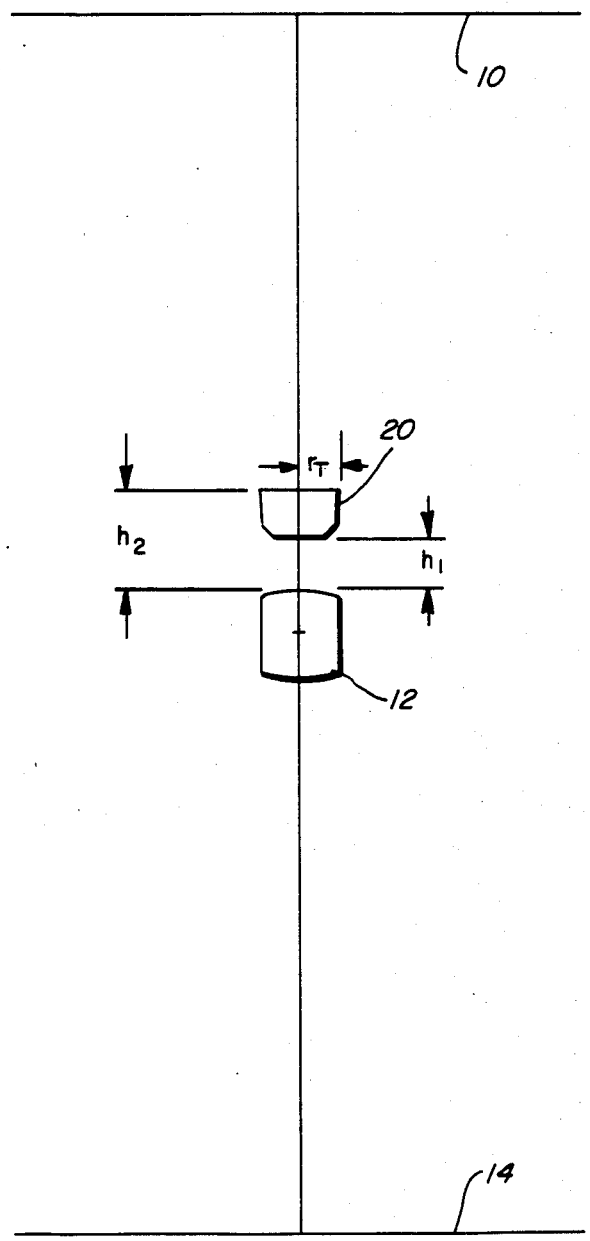
FIG. 2 shows a first solid corrector embodiment in an imaging system.

First order design equations for a solid linear cone 16 are as follows:

$$h_1 = r_o l_o / (y_m + r_o) \quad (1)$$

$$r_T = (r_o/l_o)(l_o - h_2)[1 - l_o^4/(y_m^2 + l_o^2)^2]^{\frac{1}{2}} \quad (2)$$

$$r_h = r_T(h - h_1)/(h_2 - h_1) \quad (3)$$

where h = a distance from the exit pupil of lens 12
$r_h$ = the radius of the corrector cone 16 at that distance
$r_T$ = radius of top of corrector
$h_1$ = distance from lens to corrector base
$h_2$ = distance from base to corrector top Using these equations a generally conical-shaped corrector 20 was designed and placed in an imaging system shown in FIG. 2. The system parameters are as follows:

| | |
|---|---|
| Object plane 10 to lens 12 distance $l_o$ | = 500 mm |
| Lens to image plane 14 distance (BFL) | = 500 mm |
| Maximum field angle | = 22° |
| Maximum object height | = 200 mm |
| F/# at infinity | = 8.33 |
| Semi-aperture (at lens) | = 15 mm |
| Magnification | = −1 |
| Focal length | = 250 mm |
| Lens radius of curvaturer | = 280.69 mm (equiconvex) |
| Lens thickness | = 2.2455 mm |
| Lens pupil radius $r_o$ | = 15 mm |

The base of the corrector 20 narrow end was positioned a distance $h_1 = 36.384$ mm from the lens on the object side of the lens. The corrector has dimensions listed in the following table:

TABLE

CORRECTOR DIMENSIONS

| Height (mm) | Diameter (mm) |
|---|---|
| 0 mm | 6.866 |
| 1.5 | 8.83 |
| 4.5 | 10.0 |
| 7.5 | 10.8 |
| 10.5 | 11.124 |
| 13.5 | 11.546 |
| 16.5 | 11.902 |
| 19.5 | 12.212 |
| 22.5 | 12.486 |
| 25.5 | 12.734 |
| 28.5 | 12.734 |

As shown in FIG. 2, for this particular system, the cone was parabolized in a convex manner. Ray tracing techniques were used to optimize the shape and position of the core. A 6th order parabolic shape was found to be optimum.

Figure 3:
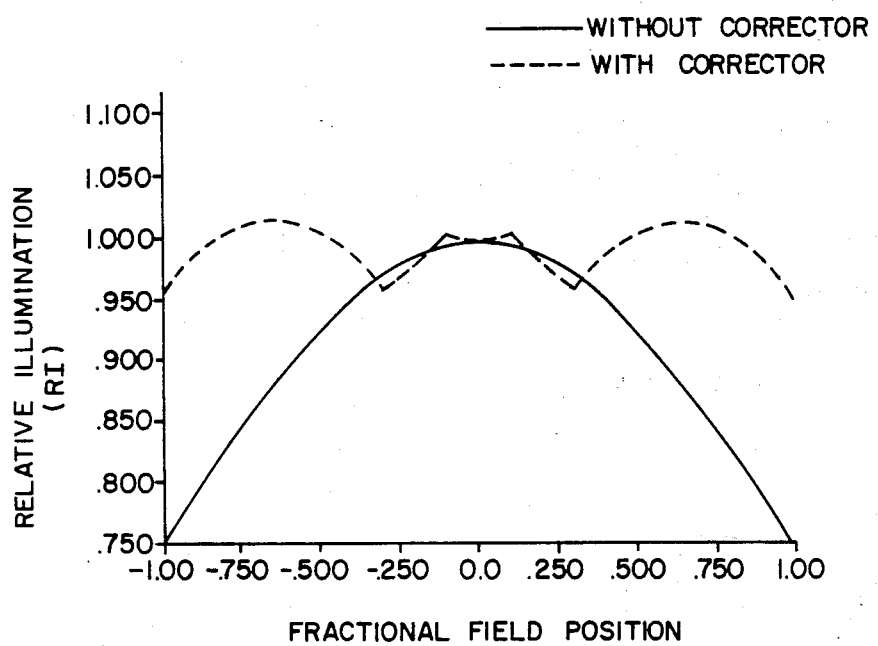
FIG. 3 is a plot of relative illumination at an image plane over the full field for a corrected and non-corrected system.

FIG. 3 shows the relative illumination improvement over the field of view both with and without the corrector impositions.

Although a solid conical blocker may be satisfactory for most imaging systems, it may be desirable to provide better image quality on-axis (or near axis) by using the central portion of the lens pupil. According to a second embodiment of the invention, the advantages of a generally conical configuration are retained but the cone is truncated and the interior made hollow.

Figure 4:
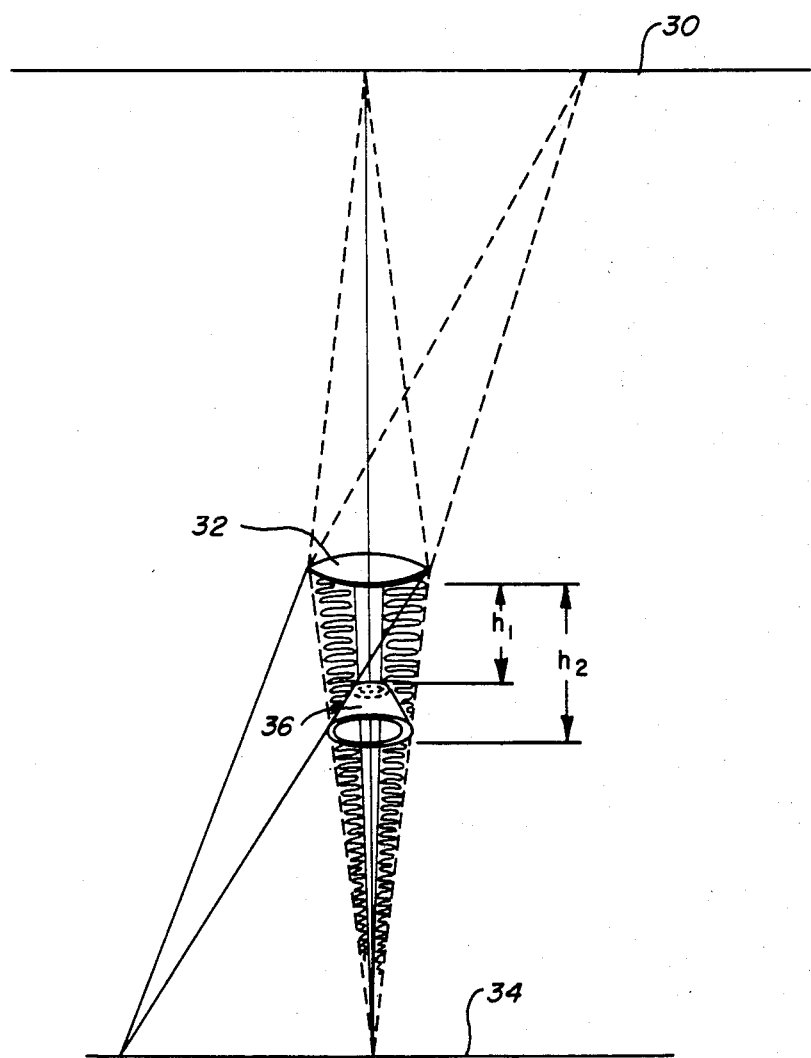
FIG. 4 shows a second, hollow, corrector embodiment used in a flash imaging system.

FIG. 4 shows a flash imaging system wherein a document placed on object plane 30 is illuminated and an image projected by lens 32 onto photosensitive image plane 34. A rotationally symmetric, hollow truncated conical corrector ring 36 is positioned on-axis between lens 32 and image plane 34. The corrector ring diameter, as shown, tapers to a smaller diameter towards the lens. The corrector ring permits full light transmission at full field but, when imaging on-axis, blocks the light that passes through the outer zener of the pupil of lens 32 (generally the most aberrated). The shaded areas indicate the blocked light when imaging on-axis.

The diameter and length of the corrector ring and its distance from lens 32 are chosen such that the irradiance incident on the image plane on-axis 10 is lowered to the level at full field. A sample design for corrector ring 36 which results in the same irradiance on-axis and at full field is given below for an equiconvex singlet lens (same lens as previously described).

Exit pupil to bottom of corrector distance $h_1 = 45.2$ mm.
Exit pupil to top of corrector distance $h_2 = 65.2$ mm.
Radius of bottom of blocker $r_B = 2.13$ mm.
Radius of top of blocker $r_T = 13.04$ mm.

First order design equations for these parameters and corrector configuration are given below:

$$h_2 = 2r_o \sin \theta \sin \Phi / \sin (\phi + \theta) \quad (4)$$

$$r_T = h_2 / \text{Tan } \theta - r_o \quad (5)$$

$$r_B = r_o \cos^2 \theta (l_o - h_1)/l_o \quad (6)$$

$h_1$ = varied to obtain best overall uniformity $\Phi = \text{Arc tan} - 1 \ (l_o/r_o), \ \theta = \text{Arc tan} \ [(l_o/y_m + r_o)]$ The wall thickness of the corrector was considered negligible and the blocker shape a right circular cone for this design.

The first order design equations do not describe the curvature of the blocker. The exact curvature (i.e., linear, parabolic) can be determined by iterating through several shapes with a lens design program which allows the input of 2-dimensional corrector which can be "stacked" to simulate a 3-dimensional blocker and it can then calculate the relative illumination across the field. A lens design program such as CODE V has proven suitable for this purpose.

For use in full frame systems the corrector ring should be rotationally symmetric as shown in FIG. 4. In slit scanning systems, only a portion of the corrector ring on either side of the lens axis is needed. The corrector for either system and in a preferred embodiment could be made out of injection molded plastic. To minimize stray light, the corrector walls should be opaque and non-reflecting. And although only a single corrector ring 36 has been described, additional rings may be used to obtain "fine tuning" compensation.

To summarize the above, a rotationally symmetric, three-dimensional relative illumination corrector of appropriate design is placed coincident with the axis of the lens in an imaging system for the purpose of compensating for cos 4 illuminator dropoff at the edges of the field so as to provide a more uniform exposure level at a photosensitive image plane. The corrector, in a first embodiment, is a solid generally cone-shaped member. In a second embodiment, the corrector is a rotationally symmetric, hollow truncated corrector ring. The corrector can be placed in object or image space or even embedded within the lens itself when used with extremely wide angle lenses. The invention utilizes the principle of selective obscuration of energy directed to, or emanating from, a lens as a function of the lens field angle. The corrector should be radially symmetrical for a lens used in a flash illumination system but need not be when used in a document scanning system.

While the invention has been described with reference to the structure disclosed, it is not confined to the details set forth, but is intended to cover such modifications or changes as may come within the scope of the following claims. For example, while the lens designs have been described as mainly for the purpose of compensating for cos 4 illumination falloff, the design corrector may also be designed to compensate for other lens defects such as pupil distortion which causes non-uniformaties in a projected image. And while the corrector was described in connection with exposing a document at a photosensitive image plane, the invention is equally applicable to wide angle projection systems, where, for example, a microfilm original is being projected upon a screen or an original is being displayed as an enlarged image at an image viewing plane.

What is claimed is:

1. In an imaging system wherein an object lying in an object plane is illuminated and an image is projected onto an image plane, in combination:
    a projection lens and at least one rotationally symmetric, generally conical-shaped corrector positioned between said object and image planes and coincident with the axis of the lens, said corrector adapted to provide a relatively uniform exposure level at the image plane.
2. The imaging system of claim 1 wherein the object is a document and the image plane has a photosensitive surface.
3. The imaging system of claim 1 wherein said corrector is a solid body.
4. The imaging system of claim 1 wherein the corrector has a hollow interior.
5. The imaging system of claim 4 wherein said corrector is a truncated conical corrector ring.
6. The imaging system of claim 4 wherein said corrector shape is a right circular cone.
7. The imaging system of claim 4 wherein said corrector shape is a 6th order parabola.

* * * * *